(12) United States Patent
Kulchytskyy et al.

(10) Patent No.: US 7,096,294 B2
(45) Date of Patent: Aug. 22, 2006

(54) METHOD AND COMPUTER PROGRAM PRODUCT FOR GRAPHICALLY PROVIDING INTERRUPT REQUEST (IRQ) ROUTING INFORMATION

(75) Inventors: Igor Kulchytskyy, Tucker, GA (US); Oleksandr Podgorsky, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 254 days.

(21) Appl. No.: 10/288,411

(22) Filed: Nov. 4, 2002

(65) Prior Publication Data
US 2003/0115394 A1  Jun. 19, 2003

Related U.S. Application Data

(60) Provisional application No. 60/340,092, filed on Nov. 2, 2001.

(51) Int. Cl.
*G06F 13/24* (2006.01)
*G06F 9/44* (2006.01)
*G06F 3/00* (2006.01)

(52) U.S. Cl. .......................... 710/260; 713/1; 713/100; 717/105

(58) Field of Classification Search ........ 710/260–269, 710/8, 10; 713/1; 703/13–21; 715/771, 715/966, 733–738; 717/105, 107
See application file for complete search history.

(56) References Cited

U.S. PATENT DOCUMENTS

| | | | | |
|---|---|---|---|---|
| 5,136,690 A | * | 8/1992 | Becker et al. ............... | 715/853 |
| 5,276,789 A | * | 1/1994 | Besaw et al. ................ | 345/440 |
| 5,943,236 A | * | 8/1999 | Ohno et al. .................. | 700/108 |
| 6,477,572 B1 | * | 11/2002 | Elderton et al. ............ | 709/224 |
| 6,643,724 B1 | * | 11/2003 | Bauman et al. ............. | 710/260 |
| 2002/0052941 A1 | * | 5/2002 | Patterson ..................... | 709/223 |
| 2002/0083258 A1 | * | 6/2002 | Bauman et al. ............. | 710/311 |
| 2002/0116563 A1 | * | 8/2002 | Lever .......................... | 710/260 |

OTHER PUBLICATIONS

Apsoft; "PCISCOPE"; Mar. 31, 2001; various pages available online at <(http://web.archive.org/web/20010602094509/www.tssc.de)>.*
Apsoft; "PCISCOPE"; Mar. 7, 2001; various pages available online at <(http://www.tssc.de/products/tools/pciscioe/news.htm)>.*
Apsoft; "PCISCOPE"; Apsoft; Mar. 31, 2001; various pages available online at <(http://web.archive.org/web/20010602094509/www.tssc.de)>.*
Apsoft; "PCISCOPE Help file";Apsoft; Feb. 6, 2002; various pages.*
"B2 Logic Version 3"; Beigebag.com; Dec. 7, 2000; available online at <http://web.archive.org/20001207095200/http://www.beigebag.com/logic3.htm>; pp. 1-3.*

* cited by examiner

*Primary Examiner*—John R. Cottingham
*Assistant Examiner*—Ryan Stiglic
(74) *Attorney, Agent, or Firm*—Hope Baldauff Hartman, LLC

(57) ABSTRACT

A method and an associated computer program product are provided for obtaining interrupt requests (IRQ) routing information in a more efficient and intuitive manner. In this regard, a graphical representation of the routing of a plurality of IRQs capable of being asserted by respective peripheral devices is constructed. The graphical representation may then be automatically converted into at least one source file containing at least some of the IRQ routing information organized in predefined manner. In this regard, at least one IRQ routing table may be constructed based upon the graphical representation of the IRQ routing.

22 Claims, 12 Drawing Sheets

Token to check

Name: [        ▷]

Condition: [  ▷ ]   Value: [        ]
           == != < > <= >=

Current value: [        ]

[ OK ]   [ Cancel ]

PCI Device Parameters

☑ Active

Belong to: [Module 1 ▾]

Title: [Slot 1]

Bus #: [0]　　Dev #: [1]

Func #: [　]　　Slot #: [1]

On board ○　　Slot ⊙

Flags:
- ⊙ 32 bit　　○ 64 bit
- ☐ LPC bridge
- ☐ PCI bridge
- Bus out #: [　]
- ☐ HotPlug
- ☐ Wake, PME
- GPE #: [　]
- Sleep #: [　]

Router... [IO APIC...]

PIN A: [LNKB ▾]　[　▾]
PIN B: [LNKC ▾]　[　▾]
PIN C: [LNKD ▾]　[　▾]
PIN D: [LNKA ▾]　[　▾]

[Dependency]  [OK]  [Cancel]

METHOD AND COMPUTER PROGRAM PRODUCT FOR GRAPHICALLY PROVIDING INTERRUPT REQUEST (IRQ) ROUTING INFORMATION

RELATED APPLICATIONS

The present application claims priority to the provisional application having Ser. No. 60/340,092 filed on Nov. 2, 2001 and entitled METHOD AND COMPUTER PROGRAM PRODUCT FOR GRAPHICALLY PROVIDING INTERRUPT REQUEST (IRQ) ROUTING INFORMATION, the contents of which are incorporated herein by reference.

FIELD OF THE INVENTION

The present invention relates generally to the configuration of interrupt requests (IRQs) in a personal computer or other computing system and, more particularly, to the technique for graphically providing IRQ routing information during the initial configuration and/or any subsequent reconfiguration of the IRQs in a personal computer or other computing system.

BACKGROUND OF THE PRESENT INVENTION

Personal computers and other computing systems generally include a central processing unit (CPU) operating under control of an operating system and/or other software. Peripheral devices are generally connected to the CPU via one or more busses. In order to notify the CPU and/or the operating system of a pending task, the peripheral devices are typically configured to issue interrupts. In order to controllably direct the interrupts to the CPU, a personal computer or other computing system may include an interrupt handler, such as a Programmable Interrupt Controller (PIC), that receives the interrupts from the peripheral devices and issues an appropriate interrupt signal to the CPU. As such, the interrupt handler effectively serves to multiplex the interrupts from the peripheral devices for presentation to the CPU. The CPU, in turn, responds to the interrupt and interacts with the peripheral device issuing the interrupt to perform the desired task or the like.

For personal computers, peripheral devices are oftentimes connected to a Peripheral Component Interconnect (PCI) bus. The PCI bus is, in turn, connected via a PCI bridge to a host bus which serves to interconnect the CPU and the main memory associated with the CPU. The PCI bus generally includes a number of slots for receiving respective peripheral devices, i.e., peripheral devices may be plugged into respective slots. While a variety of peripheral devices may be connected to the PCI bus via respective slots, typical examples include a graphics adapter, a Small Computer Systems Interface (SCSI) host adapter, a local area network (LAN) adapter, an input/output (I/O) unit and an audio and motion video unit.

The slots of a PCI bus are generally capable of issuing four IRQs, typically designed as INTA, INTB, INTC and INTD. The interrupts generated by each slot are directed to a PCI interrupt router, hereinafter referenced as a PCI router, which, in turn, issues an appropriate signal to the interrupt handler for notifying the CPU of the pending interrupt. In embodiments in which the interrupt handler is a PIC, for example, the PCI router will direct the interrupt to the PIC via a PIC bus that extends between the PCI router and the interrupt handler.

A PCI router generally includes a plurality of links, such as four links designated LNKA, LNKB, LNKC and LNKD, for receiving IRQs. In this regard, the interrupts issued by the devices inserted into respective slots of the PCI bus are connected to respective links and are therefore directed to the PCI router. Upon receipt of an interrupt via one of the links, the PCI router issues a signal to the interrupt handler which, in turn, notifies the CPU. An interrupt handler generally includes a plurality of IRQ inputs, such as sixteen IRQ inputs designated IRQO, IRQ1, . . . IRQ15. The PCI router may therefore be connected to one or more of the IRQ inputs of the interrupt handler, such as via the PIC bus or the like. For example, a PCI router may be connected to four of the IRQ inputs of an interrupt handler such that interrupts provided to the PCI router via LNKA cause an interrupt request to be asserted via a first IRQ input, interrupts provided to the PCI router via LNKB cause an interrupt request to be asserted via a second IRQ input and so on. The interrupt handler will then provide an appropriate IRQ to the CPU which, in turn, will attend to the task that originally triggered the interrupt.

Initially, the interrupts generated by the devices inserted into each slot of a PCI bus were connected to the links of the PCI router in the same fashion. In this regard, INTA of each slot was typically connected to LNKA, INTB of each slot was connected to LNKB, INTC of each slot was connected to LNKC and INTD of each slot was connected to LNKD. Since the interrupts generated by each slot were connected to the links of the PCI router in the same manner, it was difficult to identify the peripheral device that generated an interrupt. Thus, upon receiving an interrupt request, each peripheral device generally had to be polled to determine which peripheral device had generated the interrupt. In this regard, each peripheral device could include a status register that could be set to a predefined value upon the issuance of an interrupt. As such, in polling the peripheral devices, the status register of each peripheral device could be examined to determine if the peripheral device had issued the interrupt. As will be apparent, this process of polling the peripheral devices to determine which peripheral device had generated the interrupt may be somewhat time-consuming and delay the handling of the interrupt.

In order to permit the peripheral device that issued an interrupt to be identified in a more efficient manner, the interrupts generated by the respective slots of a PCI bus have been connected to the links of the PCI router in a round-robin fashion. In this regard, the interrupts generated by different slots of the PCI bus were connected to the links of the PCI router in different manners. In a round-robin configuration, the interrupts of the first slot of the PCI bus are connected such that INTA is connected to LNKA, INTB is connected to LNKB, INTC is connected to LNKC and INTD is connected to LNKD. Further, the interrupts of the second slot of the PCI bus are connected such that INTA is connected to LNKB, INTB is connected to LNKC, INTC is connected to LNKD and INTD is connected to LNKA. Similarly, the interrupts of the third slot of the PCI bus are connected to the links of the PCI router such that INTA is connected to LNKC, INTB is connected to LNKD, INTC is connected to LNKA and INTD is connected to LNKB. Finally, the interrupts of a fourth PCI slot would be connected such that INTA is connected to LNKD, INTB is connected to LNKA, INTC is connected to LNKB and INTD is connected to LNKC. Since interrupts are most frequently issued via INTA, the peripheral device that issued an interrupt may be more expeditiously determined by polling the peripheral device having INTA connected to the respective link of the PCI router which reported the interrupt. If the peripheral device having INTA connected to the respective link of the PCI router did not issue the interrupt, the other peripheral devices may then be polled.

In many instances, however, the PCI bus has more than four slots. In a round robin configuration, the interrupts of the fifth slot are generally connected to the links of the PCI router in the same manner as the interrupts of the first slot. Similarly, the interrupts of the sixth slot are generally connected in the same fashion as the interrupts of the second slot, and so forth. Additionally, other techniques for routing the interrupts of the various devices via the links to the PCI router have also been utilized. Each of these routing techniques generally required some time to be expended in order to identify the peripheral device that issued the interrupt and to thereafter respond to the interrupt.

In order to provide the operating system with information defining the routing or configuration of the IRQs so that interrupts can be handled more efficiently, IRQ routing tables have been constructed. Among other things, IRQ routing tables identify the IRQ input of the interrupt handler to which the different links of the PCI router are connected. By referring to the IRQ routing table in response to an interrupt request, the operating system can determine the link of the PCI router that provided the interrupt. By polling the peripheral devices having interrupts connected to the respective link of the PCI router and, in particular, the peripheral devices having INTA connected to the respective link of the PCI router, the operating system can more quickly determine the source of the interrupt.

Since interrupts are frequently configured or routed in different manners, such as by being connected in different sequences to the respective links of a PCI router, the IRQ routing table must generally be manually constructed. In this regard, the computers sold by different manufacturers may require different IRQ routing tables depending upon the configuration or routing of the interrupts. Likewise, different models of computers sold by the same manufacturer may require different IRQ routing tables.

Depending upon the computer, additional routing tables and/or other types of routing information may be created based upon the IRQ routing table for use by the operating system. In this regard, a PCI BIOS IRQ routing table may be constructed for use by the basic input/output system (BIOS). Additionally, a Microsoft IRQ routing table may be constructed for use by various Microsoft operating systems. Advanced Configuration and Power Interface (ACPI) IRQ routing information and/or multiprocessor (MP) IRQ routing information may be constructed. Finally, at least a portion of the data contained by the IRQ routing table may be included within the system management BIOS (SM-BIOS).

As will be apparent, the manual construction of an IRQ routing table can be relatively complex and typically requires a skilled designer having experience with interrupt routing and the manner in which different configurations or routes for interrupts are reflected in an IRQ routing table. As a result of the manual construction of the IRQ routing table, it is also possible for errors to be inadvertently introduced into the IRQ routing table as well as the other routing tables and routing information created therefrom, thereby potentially creating substantial problems in interrupt handling. As such, it would be advantageous to provide an improved technique for configuring or routing interrupts from the various peripheral devices and for generating IRQ routing tables and other types of routing information in a more efficient and accurate manner.

SUMMARY OF THE INVENTION

A method and an associated computer program product are provided for obtaining interrupt requests (IRQ) routing information in a more efficient and intuitive manner. In this regard, a graphical representation of the routing of a plurality of IRQs capable of being asserted by respective peripheral devices is constructed. The graphical representation may then be automatically converted into at least one source file containing at least some of the IRQ routing information organized in predefined manner. In this regard, at least one IRQ routing table may be constructed based upon the graphical representation of the IRQ routing.

As such, a system designer need merely construct the graphical representation of the routing of the IRQs in order to generate the IRQ routing table or other IRQ routing information that will be required by the operating system in order to respond to the interrupts generated by the various peripheral devices. Thus, the generation of the IRQ routing table or other IRQ routing information is simplified by freeing the system designer from having to manually construct the IRQ routing table and, instead, permitting the system designer to route or configure the IRQs in a much more intuitive manner via the graphical representation of the routing of the IRQs. This graphical representation may have an appearance similar to the graphical schematics provided by the manufacturers of the target hardware thereby making the generation of the IRQ routing table even more intuitive for the designer. As a result of its automatic generation in accordance with the method and computer program product of the present invention, the IRQ routing table or other routing information may be generated in a more accurate and/or reliable fashion.

One embodiment of the invention is a method of obtaining interrupt request (IRQ) routing information. The method involves constructing a graphical representation of the routing of a plurality of IRQs capable of being asserted by respective peripheral devices. The method further involves automatically converting the graphical representation of the IRQ routing into at least one source file containing at least some of the IRQ routing information organized in a predefined manner.

Another embodiment of the invention is a computer program product for obtaining interrupt request (IRQ) routing information. The computer program product includes a computer-readable storage medium having computer-readable program code portions stored therein. The computer-readable program code portions include a first executable portion that is capable of graphically representing the routing of a plurality of IRQs that are assertable by respective peripheral devices. A second executable portion is capable of automatically converting the graphical representation of the IRQ routing into at least one source file containing at least some of the IRQ routing information organized in a predefined manner.

Another embodiment is a method of obtaining interrupt request (IRQ) routing information. This method involves generating a display of a PCI router with connections and PCI devices for selection and receiving a selection of at least one PCI device and displaying the PCI device with connections. The method further involves receiving user input to graphically display PCI device connections linked to PCI router connections.

Another embodiment is a computer system for obtaining interrupt request (IRQ) routing information. The computer system includes a display and a computer program that when executed graphically represents a PCI router and at least one PCI device on the display. The computer program when executed receives user input to graphically represent links between connections of the PCI router and connections of the at least one PCI device.

BRIEF DESCRIPTION OF THE DRAWINGS AND APPENDICES

Having thus described the invention in general terms, reference will now be made to the accompanying drawings, which are not necessarily drawn to scale, and to the attached appendices, and wherein:

FIG. 4 is a "Parameters" window generated by the method and computer program product of one embodiment of the present invention for the configuration of a device;

FIG. 6 is an "10 APIC" window generated by the method and computer program product of one embodiment of the present invention;

FIG. 7 is a "Tokens" window generated by the method and computer program product of one embodiment of the present invention;

FIG. 8 is a "Parameters" window generated by the method and computer program product of one embodiment of the present invention for the configuration of a slot;

Appendix A is a text file providing routing information related to the links of the PCI router and at least some of the devices and slots in accordance with the method and computer program product of one embodiment of the present invention; and Appendix B is a source file providing IRQ routing information generated by the method and computer program product of one embodiment of the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In accordance with the present invention, a method and computer program product are provided to obtain the IRQ routing information required by the CPU and, in particular, the operating system or other computer software executed by a personal computer or other computing system in order to respond to the interrupts issued by the various peripheral devices. By way of example, the method and computer program product will be described in conjunction with interrupts issued by devices connected to one or more PCI bus. However, the interrupts may be issued by peripheral devices connected to any of a variety of other busses, if so desired.

Figure 1:
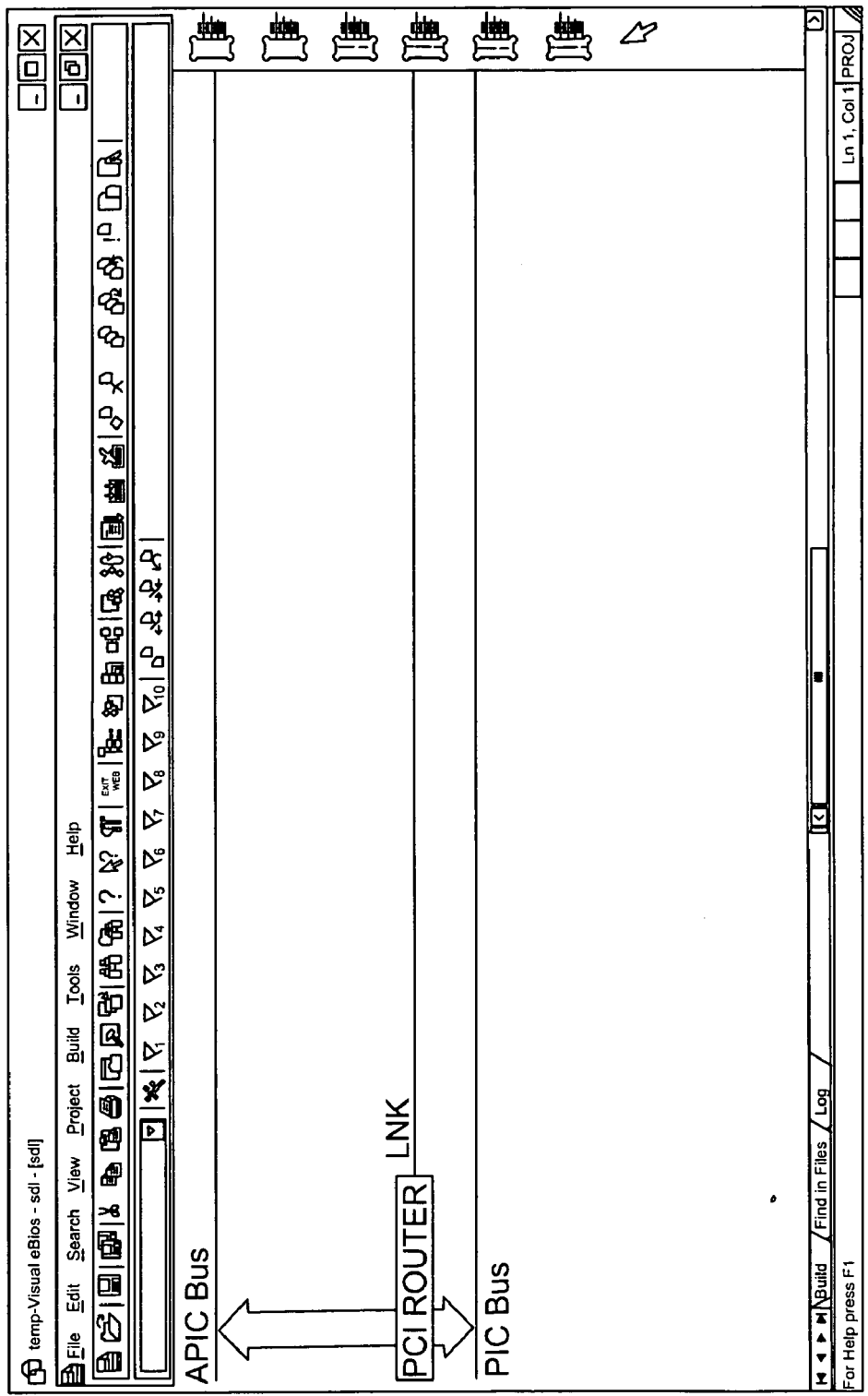
FIG. 1 is a display generated by the method and computer program product of one embodiment of the present invention which illustrates a PCI router having a single link and connected between a PIC bus and an APIC bus.

According to the present invention, a graphical representation of the routing of a plurality of IRQs is constructed. Accordingly, a graphical depiction of an interrupt router, such as a PCI router, and at least one bus, such as a PIC bus, is initially displayed on a computer monitor or the like as shown in FIG. 1. Although not shown, the bus, such as the PIC bus, typically connects the PCI router with an interrupt handler, such as a PIC, and, in turn, with the CPU.

The PCI router may be configured by selecting the PCI router, such as by double-clicking upon the graphical representation of the PCI router. The selection of the PCI router typically causes a "Router Settings" window to be displayed which has a number of fields soliciting information relevant to the router. See FIG. 2. Among other things, the "Router Settings" window permits the number of links associated with the PCI router and the identification of or other information associated with each link to be provided. In this regard, the PCI router is initially depicted with a single link. However, the PCI router typically includes a plurality of links, such as four links. As such, these additional links may be added and identified, such as LNKA, LNKB, LNKC and LNKD. An IRQ list is also associated with each link. In this regard, the PCI router is connected via the PIC bus to an interrupt handler. As known to those skilled in the art, an interrupt handler has number of inputs, typically designated IRQO, IRQ1 . . . IRQ 15. As such, the IRQ list associated with each link of the PCI router identifies those IRQ inputs which may be utilized by the PCI router for the transmission of interrupts that have been provided to the PCI router via the respective link. Thus, in the illustrated embodiment in which the IRQ list is 1, 3, 4, 5, 6, 7, 9, 10, 11, 12, 14 and 15, an interrupt provided to the PCI router via LNKA may be transmitted to the interrupt handler via IRQ1, IRQ3, IRQ4, IRQ5, IRQ6, IRQ7, IRQ9, IRQ10, IRQ11, IRQ12, IRQ14, and IRQ15.

While the IRQ list identifies the universe of IRQ inputs that may be utilized, the particular IRQ input that is associated with interrupts provided via a respective link of the PCI router is generally identified during the initial configuration of the system, such as by the BIOS or other software program utilized during initialization of the computer system. Based upon the association of each link of the PCI device with a respective IRQ input of the interrupt handler, the interrupt request provided to the interrupt handler can be associated with a respective link and in turn, with the peripheral device(s) connected to the link by means of an IRQ routing list or the like, as described below.

As known to those skilled in the art, the PCI router typically includes a plurality of registers, one of which is associated with each link. As such, upon the assertion of an interrupt via a link, the register associated with the link is set, typically to a predefined value. The "Router Settings" window therefore also permits each link to be associated with a respective register. Additionally, the mode of the interrupt request, i.e., high, low, etc., is identified such that interrupts transmitted to the PCI router may be correctly identified.

Finally, the group of the components to which the PCI router belongs may be identified. In this regard, the computing system may include a wide variety of devices, some of which are used in all models of the computing system offered for sale by all manufacturers and others of which are only utilized in certain models of the computing system or in those computing systems offered for sale by a subset of the computer manufacturers. Thus, the devices that are utilized by all models of the computing system offered for sale by all manufacturers are generally designated to belong to the core group. Alternatively, those devices that are only utilized by some models of the computing system or by those computing systems offered for sale by a subset of manufacturers are typically designated to belong to a respective module, such as module 1, module 2 or the like.

The method and computer program product also permit additional devices or slots that are connected to the PCI bus to be added and correspondingly graphically depicted. These additional devices and slots may be added in a variety of different manners. For example, the exemplary display shown in FIG. 1 includes graphical representations of various types of devices and slots along the right-hand side of the display. By placing the cursor over the graphical representation of a respective device or slot, the name or other brief description the device or slot is provided. For example, the devices and slots depicted along the right-hand side of the display depicted in FIG. 1 are a 32-bit onboard device, a 64-bit onboard device, a 32-bit slot, a 64-bit slot, a 32-bit hot pluggable slot and a 64-bit hot pluggable slot. Although particular examples of devices and slots that may be added have been provided hereinabove, additional types of devices and slots and/or devices and slots having still other sizes may be provided, if desired. Additionally, while the additional devices and slots that may be added are graphically depicted in the display of FIG. 1, the additional devices and slots may be represented in other manners, such as textually in a pull down menu or the like.

Regardless of the manner in which the additional devices or slots are represented, the system designer may select one or more of the devices or slots to be connected to a bus. While the additional devices and slots may be selected in various manners, the additional devices and slots of the illustrated embodiment are selected by double-clicking upon the graphical depiction of a respective device or slot and then dragging the device or slot into the window in which the PIC bus and the PCI router are displayed. As described in more detail below, the additional device or slot is then identified and connected to both a bus and to the various links of the PCI router.

Figure 3:
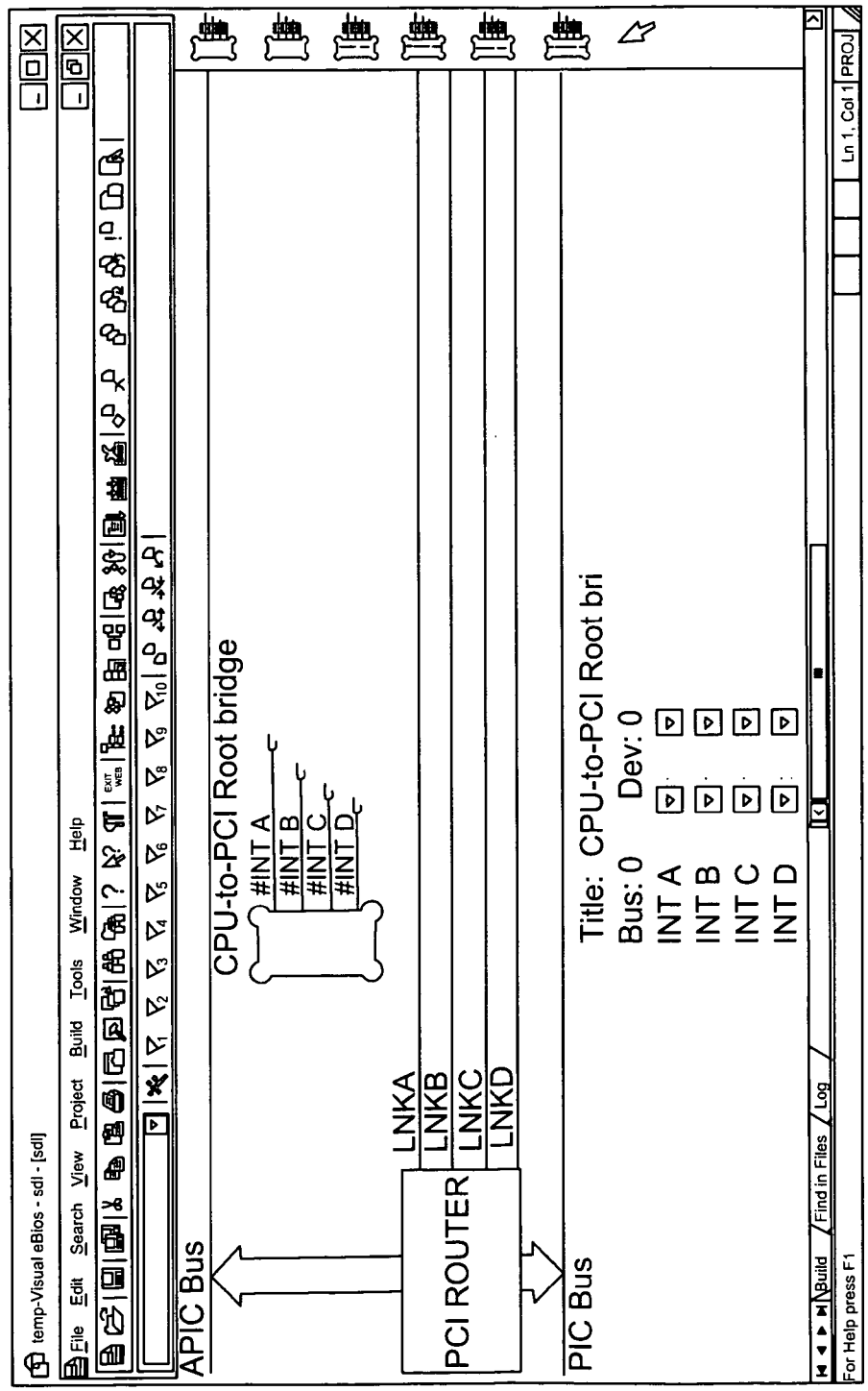
FIG. 3 is a display generated by the method and computer program product of one embodiment of the present invention which illustrates a PCI router having four links and a CPU-to-PCI Root Bridge.

Although it may be performed in other manners if so desired, each device or slot is typically added, identified and interconnected prior to adding an additional device or slot. By way of example, an onboard device is added to the system as illustrated by the display of FIG. 3. Once the device is added to the system, a "Parameters" window is automatically opened to solicit information defining the identity and the interconnection of the device. See FIG. 4. In this regard, an exemplary "Parameters" window soliciting the parameters associated with the respective PCI device is shown.

For example, the "Parameters" window solicits the title or name of the device. The device may be named as desired by the system designer, typically based upon the function to be provided by the device, such as a CPU-to-PCI Root bridge. In addition, a device number and a function number may be assigned to the device and the bus to which the device is connected is identified. In this regard, the computer system may include multiple PCI or other busses designated PCI bus 0, PCI bus 1, etc. As such, the PCI or other bus with which the device is interconnected may be identified by a respective number, such as 0, 1, 2, etc. The "Parameters" window also identifies that the device is mounted on the circuit board, as opposed to a PCI slot. Moreover, the system designer typically indicates if the device is currently active and identifies the group of components to which the device belongs, such as the core, module 1, module 2 or the like, as described above. The "Parameters" window also identifies the device as being either a 32-bit or 64-bit device and as being either an LPC bridge or a PCI bridge, if appropriate. If the device is identified to be a PCI bridge, the number or other identification of the other bus with which PCI bridge is interconnected is identified. The "Parameters" window also permits "Wake, PME" to be selected. If "Wake, PME" is selected, the GP number and the sleep number may also be provided.

Figure 5:
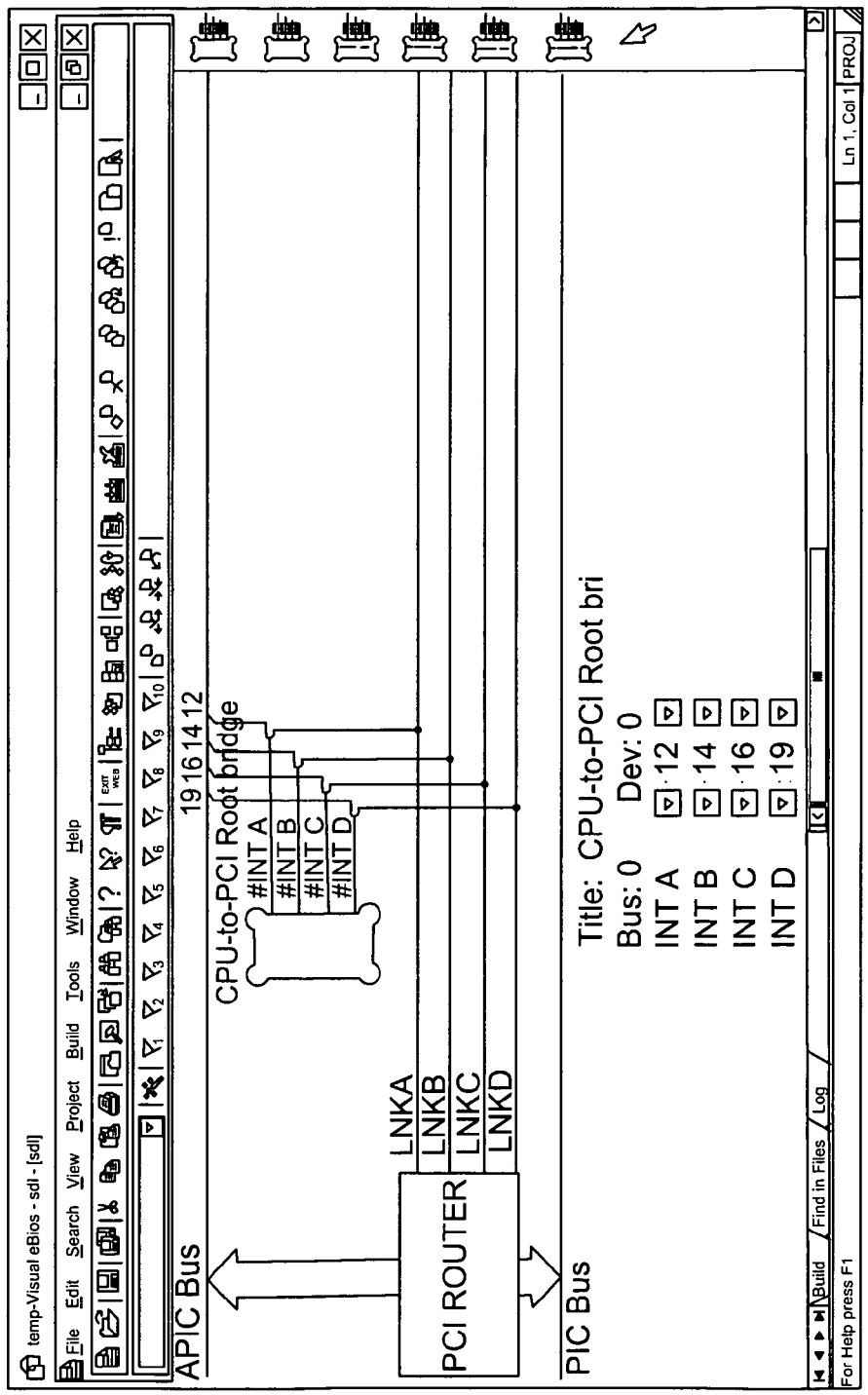
FIG. 5 is a display generated by the method and computer program product of one embodiment of the present invention which illustrates the CPU-to-PCI Root Bridge connected to the links of the PCI router and to the APIC bus.

As described hereinbelow, the connection of the interrupts issued by the device, i.e., INTA, INTB, INTC and INTD, to the various links of the PCI router may also be identified, as well as any interconnection of the interrupts to another bus, such as the APIC bus. See, for example, the designation of the interconnections of the interrupts of the CPU-to-PCI Root bridge to the links of the PCI router and to the APIC bus in the "Parameters" window of FIG. 4 as well as the corresponding graphical representation of the interconnections in the display of FIG. 5. The "Parameters" window also permits the PCI router or the 110 APIC to be configured by selecting the button designated "router" or "I/O APIC", respectively. When "router" is selected, the "Router Settings" window is displayed that permits the router settings to be set or updated in the same manner as described above. The I/O APIC may be configured in a similar manner by selecting the button labeled "I/O APIC". If this button is selected, an I/O APIC window is displayed as shown in FIG. 6. In the same manner as described above in conjunction with the "Router Settings" window, the name and the I/O APIC identification may be provided, along with the interrupt base. The number of inputs and the APIC address are also provided. An indication as to the group of components, such as the core or other module, to which the I/O APIC belongs is also solicited by the I/O APIC window.

The "Parameters" window also permits any dependency of the device to be identified. In this regard, the name of any token, and the condition and value of the token which must be met prior to the issuance of interrupts can be identified via a corresponding window as shown in FIG. 7. For example, the token may be required to be equal, less than or equal to, less than, greater than, or greater than or equal to a particular value in order to permit interrupts to be issued by the respective device.

If a slot, as opposed to a device, is to be added to the PCI bus, a similar "Parameters" window is displayed as shown in FIG. 8. Although the function number is no longer solicited, the slot number of the newly added slot is requested. Further, the designer is requested to identify if the slot is hot-pluggable. Otherwise, the "Parameters" window associated with a slot solicits the same information as the "Parameters" window associated with a device.

Figure 9:
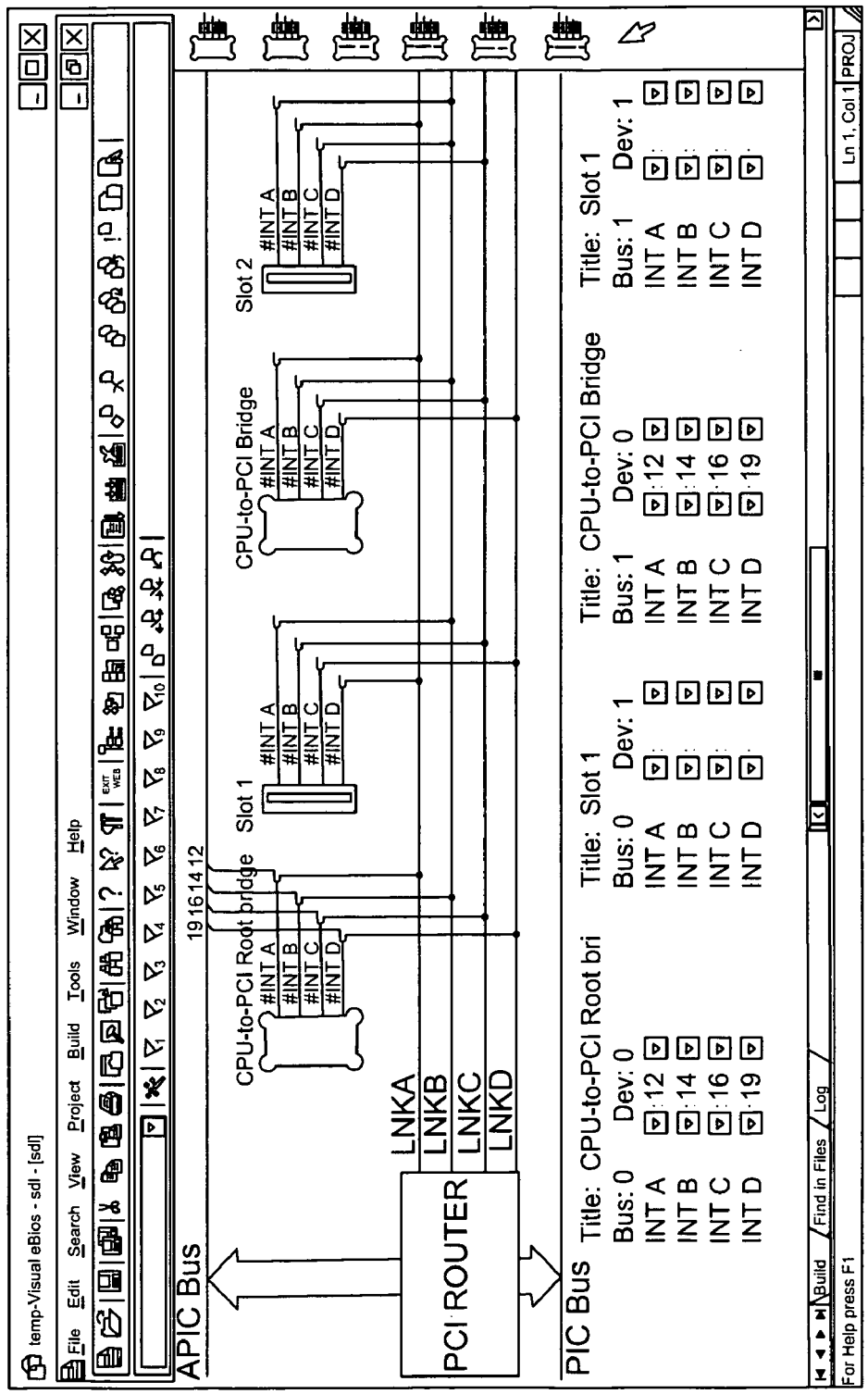
FIG. 9 is a display generated by the method and computer program product of one embodiment of the present invention which illustrates a plurality of devices and slots connected to the links of the PCI router.
Figure 10:
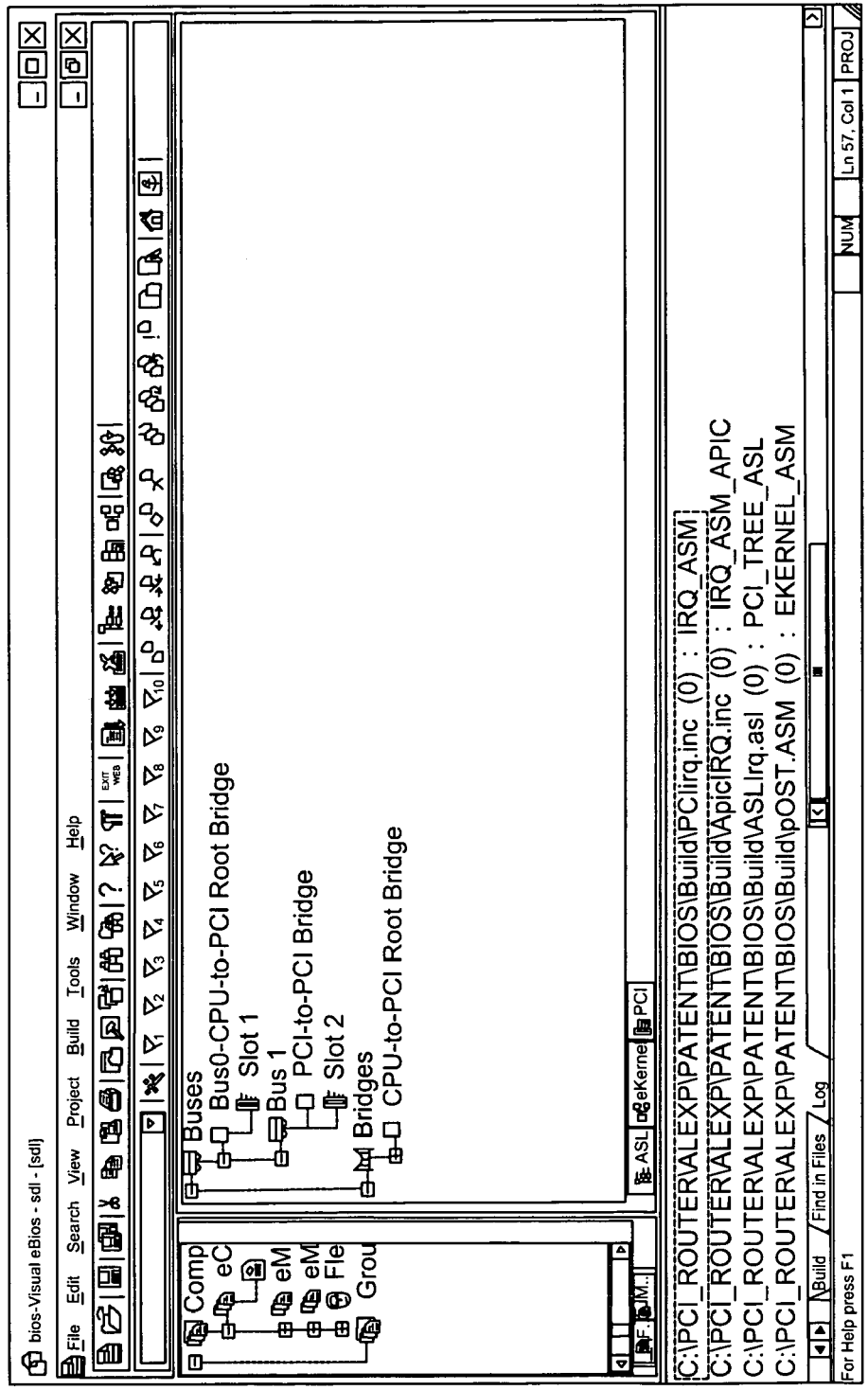
FIG. 10 is a display generated by the method and computer program product of one embodiment of the present invention which illustrates the devices and slots connected to the various busses.

By way of example, one configuration of the interrupts generated by various devices and slots is depicted in FIG. 9. In this regard, INTA of the CPU-to-PCI Root Bridge is connected to LNKA, INTB is connected to LNKB, INTC is connected to LNKC and INTD is connected to LNKD. Further, INTA of slot 1 is connected to LNKB, INTB is connected to LNKC, INTC is connected to LNKD and INTD is connected to LNKA. Similarly, the second device, i.e., a PCI-to-PCI bridge, and slot 2 have interrupts connected to respective links of the PCI device in a similar manner. As shown, the interrupts may be connected to various links with the interrupts generated by different devices and slots connected to the same link in some instances. Moreover, multiple interrupts from the same device or slot may be connected to the same or different links, as desired.

The interrupts are generally connected in a graphical manner by selecting an interrupt of a particular device or slot, such as by double-clicking upon the name of a respective interrupt, and then dragging a line extending from the device or slot to a particular link of the PCI router. Once the connection has been made graphically, the connection is also noted in the "Parameters" window which identifies the interrupts connected to the respective links of the PCI router. Alternatively, the interconnection between an interrupt and a respective link of the PCI router may be entered via the respective field in the "Parameters" windows with the graphical representation correspondingly being adjusted in accordance with the designated interconnection. Regardless of the manner in which the interconnections are made, the resulting graphical depiction provides a clear representation of the manner in which the interrupts are connected to the links of the PCI router.

As illustrated in the display of FIG. 9, the routing information associated with each device or slot may be summarized in a table. In this regard, a table is associated with each device or slot that identifies the name of the respective device or slot, the bus number with which the device or slot is connected, the device number and the links of the PCI router with which the various interrupts of the device or slot are connected. Although these tables may be depicted in various manners, these tables are oftentimes depicted in the same window as the graphical representation of the routing of the IRQs immediately below the respective devices or slots.

Although not necessary for the practice of the present invention, the interrupts of the devices or slots may also be connected directly to another bus, such as the APIC bus as illustrated. Due to the size of the APIC bus, an interrupt router is not generally required and the interrupts can instead be connected directly to respective lines of the APIC bus. For example with respect to the CPU-to-PCI Root bridge, INTA may be connected to line 12 of the APIC bus, INTB may be connected to line 14 of the APIC bus, INTC may be connected to line 16 of the APIC bus and INTD may be connected to line 19 of the APIC bus. This information can also be summarized in the tables associated with each device or slot that are displayed, generally concurrently with the graphical representation of the interrupt routing. Additionally, this information may be displayed and changed, if desired, by means of the "Parameters" windows described above.

According to one aspect of the present invention, the devices and slots connected to each bus can also be displayed along with a listing of the bridge devices. Typically, this display is presented in a separate window. As shown, the devices and slots that are connected to bus 0 and bus 1 may be separately listed. As such, this display provides quick reference for the system designer as to the components connected to each bus and the bridge devices that are available.

Once the routing or configuration of the interrupts has been provided by means of the graphical depiction of the interrupt routing, the graphical representation of the IRQ routing may be converted into a source file. As described below, the graphical depiction of the interrupt routing is typically converted into a text file which, in turn, is then converted into a source file which may then be accessed by BIOS, by the operating system or by other software in order to construct a more specific IRQ routing table or to otherwise access the IRQ routing information. However, the source file may be constructed directly from the graphical representation of the IRQ routing, if desired.

In the embodiment in which the graphical representation of the routing of the IRQs is initially converted into a text file, one exemplary text file is provided in Appendix A. As illustrated, the text file generally includes an entry for each link of the PCI router which summarizes the IRQ routing information that was previously entered. In addition, the text file may include an entry for each device and slot. By way of example, for a device, the text file generally identifies the CPU-to-PCI Root bridge as well as the corresponding configuration information. While the illustrative text file includes only a single device, the text file could include multiple devices and slots, if desired. Once constructed, the text file may be converted into at least one source file.

The source file typically involves a reorganization of the routing information defined by the text file and collected during the process of graphically configuring the IRQs. While the source file may be organized in various manners, the source file is typically organized in a tabular format as set forth in Appendix B. As will be noted, the organization of the source file is similar, if not identical, to the organization of a conventional IRQ routing table. However, the source file may be organized in other predefined manners, if so desired.

With respect to the version of the source file set forth in Appendix B, each line or row of the source file relates to a respective device or slot. While the source file may only include IRQ routing information which will be accessed by BIOS, the operating system or other software, the source file may be an executable file as shown in Appendix B. In this regard, each row of the source file is a macro routine designated "pci_irq_entry" and having a number of parameters as described below. In this embodiment, for example, the parameters of each macro function include the bus number and device number (shifted left three places) of the respective device or slot. In addition, for each interrupt of the respective device or slot, the register within the PCI router that will be set or otherwise populated in response to its assertion is defined. In addition, parameters include an identification of the IRQ inputs of the interrupt handler that the respective interrupt may activate, i.e., the IRQ list. While the IRQ list may be defined in different manners, a mask in which each bit of the mask corresponds to a respective IRQ input with the bit being set if the IRQ list includes the respective IRQ input and with the bit not being set if the corresponding IRQ input is not in the IRQ list.

This source file may then be compiled with the macro functions associated with each device or slot generating appropriate headers and/or footers or other labels or the like to identify the IRQ routing information associated with the respective device or slot. Depending upon the type of computer system, a source file may be converted into one or more additional files. For example, the source file may be converted into a PCI BIOS IRQ routing table to facilitate the identification of interrupts by BIOS. Likewise, the source file may be converted into a Microsoft IRQ routing table such that various Microsoft operating systems may identify the interrupts. Still further, ACPI routing information, MS IRQ routing information and/or SMBIOS routing information may be constructed as will become apparent to those skilled in the art.

As a result of the graphical representation of the configuration and routing of the IRQs and the subsequent automatic conversion of the graphical representation into a source file containing at least some of the IRQ routing information, these IRQ routing tables and/or other IRQ routing information need not be manually generated. As such, the configuration of the IRQs generally proceeds much more efficiently. Additionally, the graphical representation of the IRQ routing information is quite intuitive, thereby facilitating the definition of the routing or configuration of the IRQs to be performed with increased accuracy and without requiring as much training and experience on the part of the system designer as in the past.

In operation, the devices or slots connected to the PCI or other bus will generate an interrupt. The interrupt is asserted via a respective link of the interrupt router and causes the register associated with the respective link to be set to a predefined value. Based upon the IRQ input of the interrupt handler selected from the IRQ list of the link and assigned during initialization of the computer system, the PCI router asserts the respective IRQ input. Once an IRQ input is asserted, the interrupt handler issues an interrupt to the CPU. Based upon the IRQ input that has been asserted and the IRQ routing table or other routing information that has been created based upon the graphical representation of the IRQ routing, the operating system identifies the peripheral device that issued the interrupt in a conventional manner known to those skilled in the art.

In this regard, FIGS. 1–10 are illustrative displays and Appendices A and B are files generated by methods and computer program products according to the invention. It will be understood that the computer program products are comprised of computer program instructions that may be loaded onto a computer or other programmable apparatus to produce a machine, such that the instructions which execute on the computer or other programmable apparatus create means for implementing the various functions described hereinabove. These computer program instructions may also be stored in a computer-readable memory that can direct a computer or other programmable apparatus to function in a particular manner, such that the instructions stored in the computer-readable memory produce an article of manufacture including instruction means which implement the functions described hereinabove. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions described above.

From the preceding discussion, one of ordinary skill in the art will recognize the computer systems and logical operations performed by the computer systems that may implement the various embodiments of the invention. However, an illustrative computer system and set of logical operations for bringing about the displays of FIGS. 1–10 and files of Appendices A and B are described below with reference to FIGS. 11 and 12.

Figure 11:
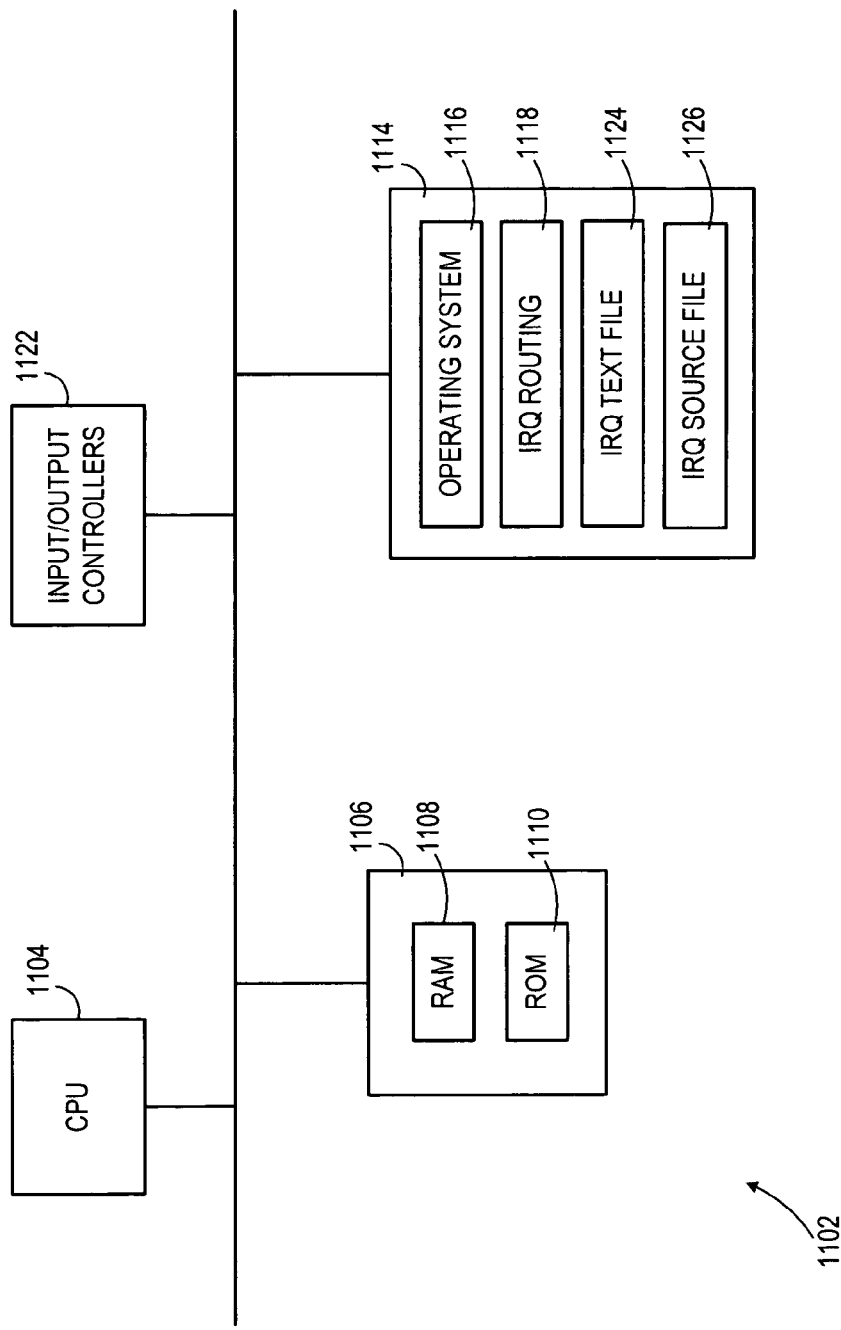
FIG. 11 shows the components of a computer system for implementing various embodiments of the present invention to produce the displays of FIGS. 1–10.

FIG. 11 and the following discussion are intended to provide a brief, general description of a suitable computing environment in which the invention may be implemented. While the invention will be described in the general context of program modules that execute in conjunction with application programs that run on an operating system on a personal computer, those skilled in the art will recognize that the invention may also be implemented in combination with other program modules. Generally, program modules include routines, programs, components, data structures, and other types of structures that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention as applied to the personal computer 1102 of FIG. 11 may also be practiced in distributed computing environments where tasks are performed by remote processing devices that are linked through a communications network rather than in a single computer. In a distributed computing environment, program modules may be located in both local and remote memory storage devices.

FIG. 11 shows an illustrative computer architecture for the personal computer for practicing the various embodiments of the invention. The computer architecture shown in FIG. 11 illustrates a conventional personal computer, including a central processing unit 1104 ("CPU"), a system memory 1106, including a random access memory 1108 ("RAM") and a read-only memory ("ROM") 1110, and a system bus 1112 that couples the memory to the CPU 1104. A basic input/output system containing the basic routines that help to transfer information between elements within the computer, such as during startup, is stored in the ROM 1110. The personal computer 1102 further includes a mass storage device 1114 for storing an operating system 1116 and application programs, such as the IRQ application program 1118 that produces the displays of FIGS. 1–10 and receives corresponding user input to render the files of Appendices A and B. The mass storage device 1114 also stores the text file 1124 and source file 1126.

The mass storage device 1114 is connected to the CPU 1104 through a mass storage controller (not shown) connected to the bus 1112. The mass storage device 1114 and its associated computer-readable media, provide non-volatile storage for the personal computer 1102. Although the description of computer-readable media contained herein refers to a mass storage device, such as a hard disk or CD-ROM drive, it should be appreciated by those skilled in the art that computer-readable media can be any available media that can be accessed by the personal computer 1102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product as discussed above in relation to FIGS. 1–10.

The personal computer 1102 may also include an input/output controller 1122 for receiving and processing user input from a number of devices, including a keyboard or mouse (not shown). As discussed above, the user input is received to provide the links between the PCI router connections and the connections of the PCI devices and slots. Similarly, the input/output controller 1122 may provide output to a display screen, a printer, or other type of output device to produce the displays of FIGS. 1–10.

As mentioned briefly above, a number of program modules and data files may be stored in the mass storage device 1114 and RAM 1108 of the personal computer 1102, including an operating system 1116 suitable for controlling the operation of the personal computer 1102. The mass storage device 1114 and RAM 1108 may also store one or more application programs such as the IRQ routing program 1118 and corresponding text file 1124 and source file 1126.

Embodiments of the present invention provide program modules for use in conjunction with the IRQ router program 1118. The program modules implement logical operations to graphically represent the PCI router, PCI devices and slots, and the related links and to generate the text file 1124 and/or source file 1126. Various embodiments of the logical operations of the program modules for the IRQ routing program 1118 are discussed below with reference to FIG. 12.

Figure 2:
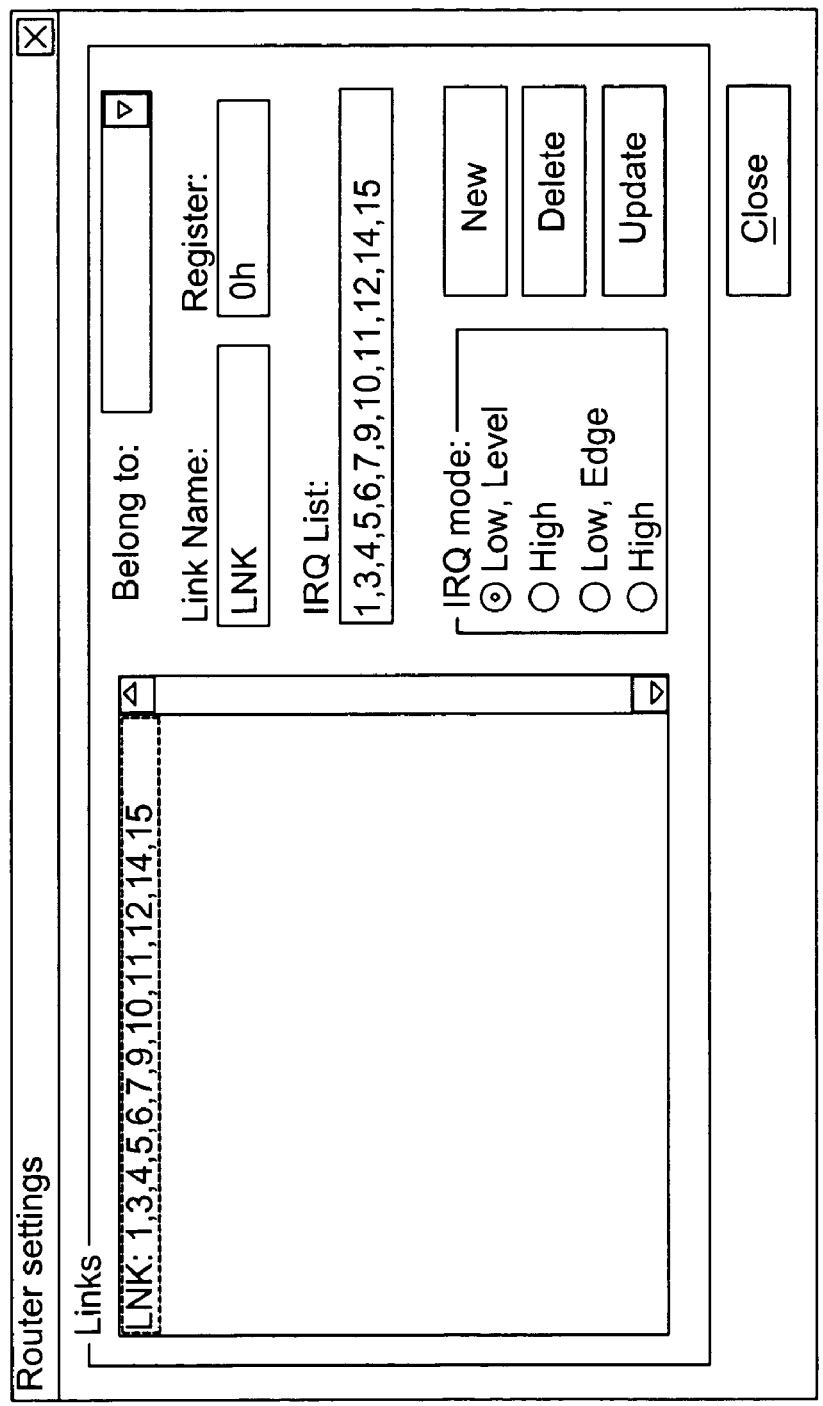
FIG. 2 is a "Router settings" window generated by the method and computer program product of one embodiment of the present invention.
Figure 12:
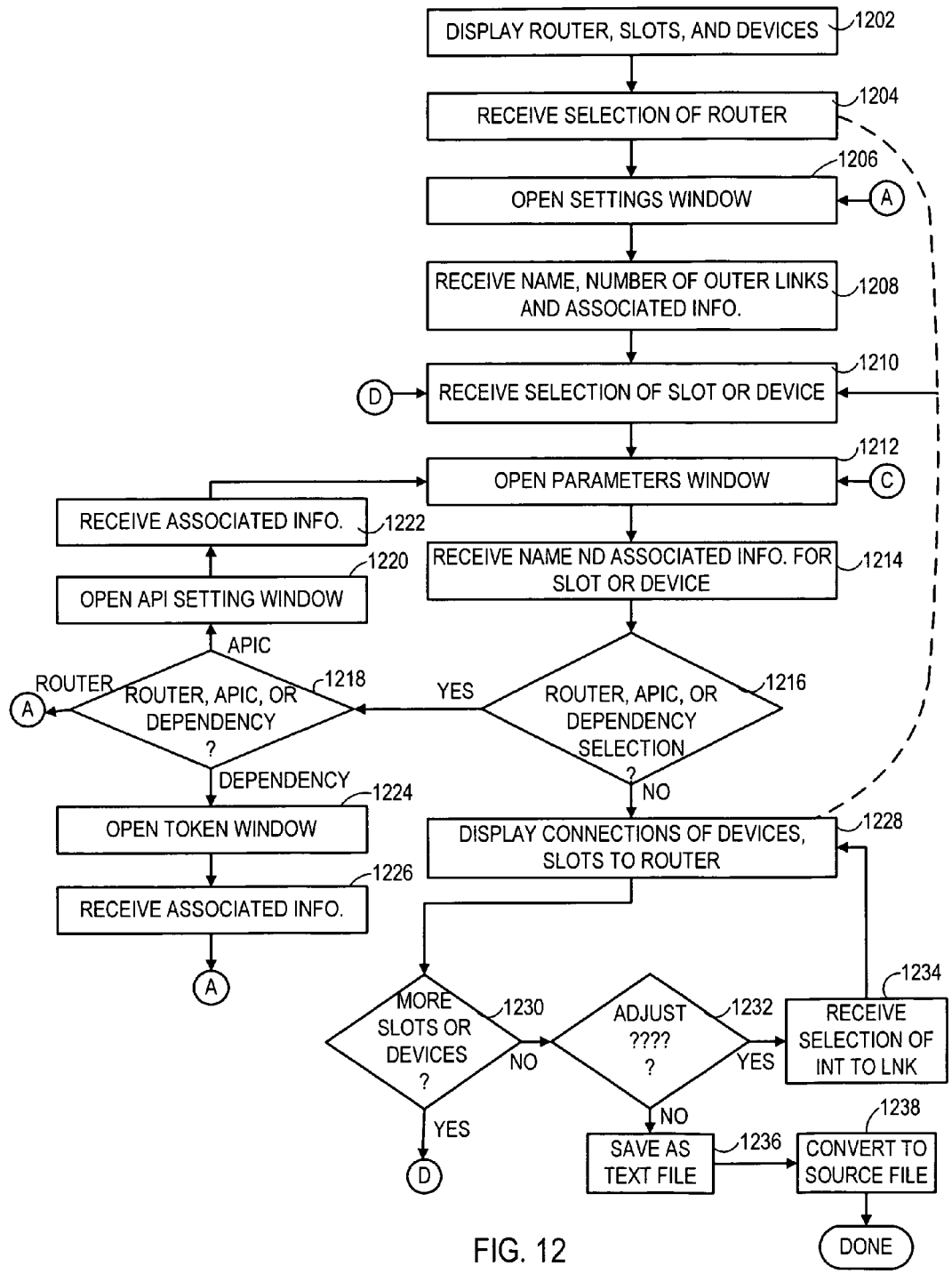
FIG. 12 shows the logical operations performed by various embodiments of the present invention to produce the displays of FIGS. 1–10.

The logical operations of FIG. 12 begin at display operation 1202 where the IRQ router program 1118 displays a PCI router on screen with PCI slots and PCI devices displayed as options to be selected as shown in FIG. 1. The IRQ router program 1118 then receives user input that selects the displayed PCI router at selection operation 1204. Upon the PCI router being selected, the IRQ router program 1118 opens a router settings window as shown in FIG. 2 at display operation 1206. The IRQ router program 1118 then receives user input at input operation 1210. The input specifies the name and number of links of the PCI router as well as additional information such as the group name, IRQ mode, IRQ list, and register address.

The IRQ routing program 1118 then receives the selection of a PCI slot or PCI device at selection operation 1210, which is then graphically represented on the display in proximity to the PCI router as shown in FIG. 3. Upon the selection of the PCI slot or device after it has been displayed, the IRQ routing program 1118 displays a parameters window for the selected PCI slot or device as shown in FIG. 4 (device) or FIG. 8 (slot) at display operation 1212. The IRQ routing program 1118 receives user input at input operation 1214. The input specifies additional information for the slot or device such as but not limited to the link connections of the PCI router that each pin of the PCI slot or device is connected to as well as the bus number, device number, and function number for the device and slot number for the slot.

Upon the user completing the entry of information for the PCI slot or device, the IRQ routing program 1118 determines whether the user has selected the router, APIC, or dependency selection within the parameters window at query operation 1216. If none of the three have been selected, then operational flow proceeds to display operation 1228 where the IRQ routing program 1118 displays the PCI router with links connected to pins of the PCI device. Such a display is shown for FIG. 5 and FIG. 9. Operational flow then proceeds to query operation 1232 or returns to input operation 1210 or display operation 1206 depending upon the selection of the user at this time. For example, the user may select the PCI router at selection operation 1206 to redisplay the setting window for the PCI router. Likewise, the user may select the PCI slot or device at selection operation 1210 to redisplay the parameter window for the device or slot.

If either the router, APIC, or dependency option has been selected, then query operation 1218 directs operational flow depending upon which option has been selected. When the router option has been selected, then the IRQ routing program 1118 opens the router settings window at operation 1206 so that the user can modify the information input for the PCI router. When the APIC option has been selected, then the APIC bus settings window as shown in FIG. 6 is opened at display operation 1220 and user input is received for the APIC bus at input operation 1222. When the dependency option has been selected, then the token window as shown in FIG. 7 is opened at display operation 1224, and user input is received for the token at input operation 1226.

Upon the user completing the entry of information for the APIC or dependency windows, operational flow returns to display operation 1212 to display the parameters window for the PCI slot or device. Upon the user completing entry of the information for the parameters window, operational flow returns to the display operation 1228 where the PCI router and PCI slots and/or devices are displayed with the specified links between them being graphically represented.

At query operation 1230, the IRQ routing program 1118 detects whether additional PCI slots or devices have been selected prior to a user saving the display to a text file. If so, then operational flow returns to selection operation 1210 where the user selects another PCI slot or device to add and configure. If not, then query operation 1232 detects whether the user is applying an adjustment to the graphical representation of the PCI router, slots and devices by selecting the links and moving them to different connections that are displayed prior to saving the display to a text file. If so then, upon the user applying the change, operational flow returns to display operation 1228 where the change in links between the router and slot or device is graphically represented in the display. If there is no adjustment prior to the display being saved, then operation flow transitions to save operation 1236.

At save operation 1236, the user selects to save the display with the graphical representation of the PCI router linked to the slots and devices, and the IRQ routing program responds by producing a text file 1124 such as the text file of Appendix A. Then, at conversion operation 1238, the IRQ routing program 1118 converts the text file to the source file 1126 such as the source file of Appendix B. The source file 1126 is then ready to be used in conventional processes to produce the BIOS or OS IRQ routing tables.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of obtaining interrupt request (IRQ) routing information, the method comprising:
   providing a user interface through which user input is received to define the IRQ routing information by constructing a graphical representation that defines the routing of a plurality of IRQs capable of being asserted by respective peripheral devices; and
   automatically converting the graphical representation of the IRQ routing into at least one source file containing at least some of the IRQ routing information organized in a predefined manner.

2. The method of claim 1, wherein the method further comprises constructing at least one IRQ routing table based upon the graphical representation of the IRQ routing from the at least one source file.

3. The method of claim 1, wherein constructing the graphical representation comprises:
   displaying a PCI router with connections and a PCI device with connections; and
   receiving user input to establish links between the PCI router connections and the PCI device connections.

4. The method of claim 3, wherein receiving user input comprises receiving input on the graphical representation displaying the PCI router and the PCI device.

5. The method of claim 3, wherein receiving user input comprises:
   displaying a window where a connection value of the PCI router can be entered for a connection of the PCI device; and
   receiving user input in the window to enter the PCI router connection value.

6. The method of claim 3, wherein constructing the graphical representation further comprises displaying the PCI router connections linked to the PCI device connections.

7. A computer program product for obtaining interrupt request (IRQ) routing information, the computer program product comprising a computer-readable storage medium having computer-readable program code portions stored therein, the computer-readable program code portions comprising:
   a first executable portion capable of providing a user interface through which user input is received to define the IRQ routing information by creating a graphical representation of the routing of a plurality of IRQs that are assertable by respective peripheral devices; and
   a second executable portion capable of automatically converting the graphical representation of the IRQ routing into at least one source file containing at least some of the IRQ routing information organized in a predefined manner.

8. The computer program product of claim 7, wherein said second executable portion is further capable of constructing at least one IRQ routing table based upon the graphical representation of the IRQ routing.

9. The computer program product of claim 7, wherein the first executable portion is capable of constructing the graphical representation by displaying a PCI router with connections and a PCI device with connections and by receiving user input to establish links between the PCI router connections and the PCI device connections.

10. The computer program product of claim 9, wherein the first executable portion receives user input by receiving input on the graphical representation displaying the PCI router and the PCI device.

11. The computer program product of claim 9, wherein the first executable portion receives user input by displaying a window where a connection value of the PCI router can be entered for a connection of the PCI device and by receiving user input in the window to enter the PCI router connection value.

12. The computer program product of claim 9, wherein the first executable portion constructs the graphical representation by displaying the PCI router connections linked to the PCI device connections.

13. A method of obtaining interrupt request (IRQ) routing information, the method comprising:
   generating a display of a PCI router with connections and PCI devices for selection;
   receiving a selection of at least one PCI device and displaying the PCI device with connections;
   receiving user input to graphically define PCI device connections linked to PCI router connections; and
   automatically converting the graphical display into at least one source file containing at least some of the PCI device connections organized in a predefined manner.

14. The method of claim 13, further comprising:
   displaying at least one bus with the PCI router and PCI device; and
   receiving user input to graphically display PCI device connections linked to the at least one bus.

15. The method of claim 13, wherein the user input comprises receiving an entry of PCI router connection name for each PCI device connection.

16. The method of claim 13, wherein the user input comprises a selection of a PCI router connection in conjunction with a selection of a PCI device connection to create a link.

17. The method of claim 13, wherein generating a display of a PCI router with connections comprises:
   displaying the PCI router with a first connection;
   receiving user input to specify additional connections; and
   displaying the PCI router with the first connection and the additional connections specified by user input.

18. A computer system for obtaining interrupt request (IRQ) routing information, comprising:
   a display; and
   a computer program that when executed graphically represents a PCI router and at least one PCI device on the display, receives user input to graphically define links between connections of the PCI router and connections of the at least one PCI device, and automatically converts the graphical representation of links into at least one source file containing at least some of the links organized in a predefined manner.

19. The computer system of claim 18, wherein the computer program when executed graphically represents at least one bus with the PCI router and PCI device on the display and receives user input to graphically display PCI device connections linked to the at least one bus.

20. The computer system of claim 18, wherein the user input comprises receiving entry of a PCI router connection name for each PCI device connection.

21. The computer system of claim 18, wherein the user input comprises a selection of a PCI router connection in conjunction with a selection of a PCI device connection to create a link.

22. The computer system of claim 18, wherein the computer program when executed graphically represents a PCI router with connections by graphically representing the PCI router with a first connection, receiving user input to specify additional connections, and graphically representing the PCI router with the first connection and the additional connections specified by user input.

* * * * *